United States Patent
Kracht (10) Patent No.: US 7,203,750 B1
(45) Date of Patent: *Apr. 10, 2007

(54) METHOD AND APPARATUS FOR CONTROLLING THE DISSEMINATION OF INFORMATION VIA HTTP BY USING NETWORK PHYSICAL TOPOLOGY INFORMATION

(75) Inventor: James E. Kracht, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 645 days.

This patent is subject to a terminal disclaimer.

(21) Appl. No.: 10/131,538

(22) Filed: Apr. 23, 2002

Related U.S. Application Data (63) Continuation-in-part of application No. 09/922,175, filed on Aug. 1, 2001.

(51) Int. Cl.
*G06F 15/173* (2006.01)

(52) U.S. Cl. ................ 709/224; 709/220; 709/222; 709/223

(58) Field of Classification Search ........... 709/223, 709/224, 222, 220
See application file for complete search history.

(56) References Cited

U.S. PATENT DOCUMENTS

| | | | |
|---|---|---|---|
| 6,243,756 B1 * | 6/2001 | Whitmire et al. | 709/232 |
| 6,415,314 B1 * | 7/2002 | Fee et al. | 709/201 |
| 6,697,360 B1 * | 2/2004 | Gai et al. | 370/389 |
| 6,757,748 B1 * | 6/2004 | Hipp | 710/2 |
| 6,820,136 B1 * | 11/2004 | Pham et al. | 709/248 |
| 2003/0120822 A1 * | 6/2003 | Langrind et al. | 709/251 |
| 2004/0031030 A1 * | 2/2004 | Kidder et al. | 717/172 |

* cited by examiner

*Primary Examiner*—Rupal Dharia
*Assistant Examiner*—Nicholas R. Taylor
(74) *Attorney, Agent, or Firm*—Sierra Patent Group, Ltd.

(57) ABSTRACT

A method and apparatus for a communications system apparatus with an Ethernet backplane and at least one system processing engine ("SPE") and a system manager SPE ("SMSPE"), for requesting chassis data from the SMSPE by the SPE and SMSPE. The method comprising: determining the IP address of the SMSPE; and issuing a request for Chassis Data to the SMSPE. Also, a method and apparatus for the communications system for sending chassis data from the SMSPE to the at least one SPE and SMSPE and verifying that the requesting SPE and SMSPE are part of the communications system.

36 Claims, 8 Drawing Sheets

|   | 1 | 2 | 3 | 4 | 5 | 6 | 7 | 8 |                    |
|---|---|---|---|---|---|---|---|---|--------------------|
|   |   |   |   |   |   |   |   |   | IP ADDRESS         |
|   |   |   |   |   |   |   |   |   | MAC ADDRESS        |
|   |   |   |   |   |   |   |   |   | SYSTEM NAME        |
|   |   |   |   |   |   |   |   |   | SNMP COMM. STRING  |
|   |   |   |   |   |   |   |   |   | PASSWORDS          |
|   |   |   |   |   |   |   |   |   | USERNAMES          |
|   |   |   |   |   |   |   |   |   | WICS               |
|   |   |   |   |   |   |   |   |   | VICS               |
|   |   |   |   |   |   |   |   |   | OPTIONAL DATA ITEM |

METHOD AND APPARATUS FOR CONTROLLING THE DISSEMINATION OF INFORMATION VIA HTTP BY USING NETWORK PHYSICAL TOPOLOGY INFORMATION

CROSS-REFERENCE

This application is a continuation in part of U.S. application Ser. No. 09/922,175, filed on Aug. 1, 2001, entitled "Identifying Modular Chassis Composition by Using Network Physical topology Information."

BACKGROUND OF INVENTION

1. Field of Invention

The present invention relates to the communication of sensitive information in a modular network system.

2. The Background Art

The widespread use and acceptance of the Internet has generated much excitement, particularly among those who see advantages in networking their voice and data communications in an Integrated Communications System ("ICS").

In order to provide a low cost and effective ICS for small to midsize businesses, an ICS is desired that does not require a highly trained computer network specialist to be on staff with that business, such as an automatically configurable ICS.

A potential problem in having an automatically configurable ICS is that sensitive data may be communicated between components of the ICS through a communication protocol such as HTTP, therefore hackers, using rogue software, may attempt to gain access to the sensitive data being communicated to various components of an ICS.

BRIEF DESCRIPTION OF THE DRAWINGS

The present invention is described in greater detail by referencing the accompanying drawings.

DETAILED DESCRIPTION

Those of ordinary skill in the art will realize that the following description of the present invention is illustrative only and not in any way limiting. Other embodiments of the invention will readily suggest themselves to such skilled persons.

OVERVIEW OF SYSTEM

Exemplary ICS Chassis

Figure 1:
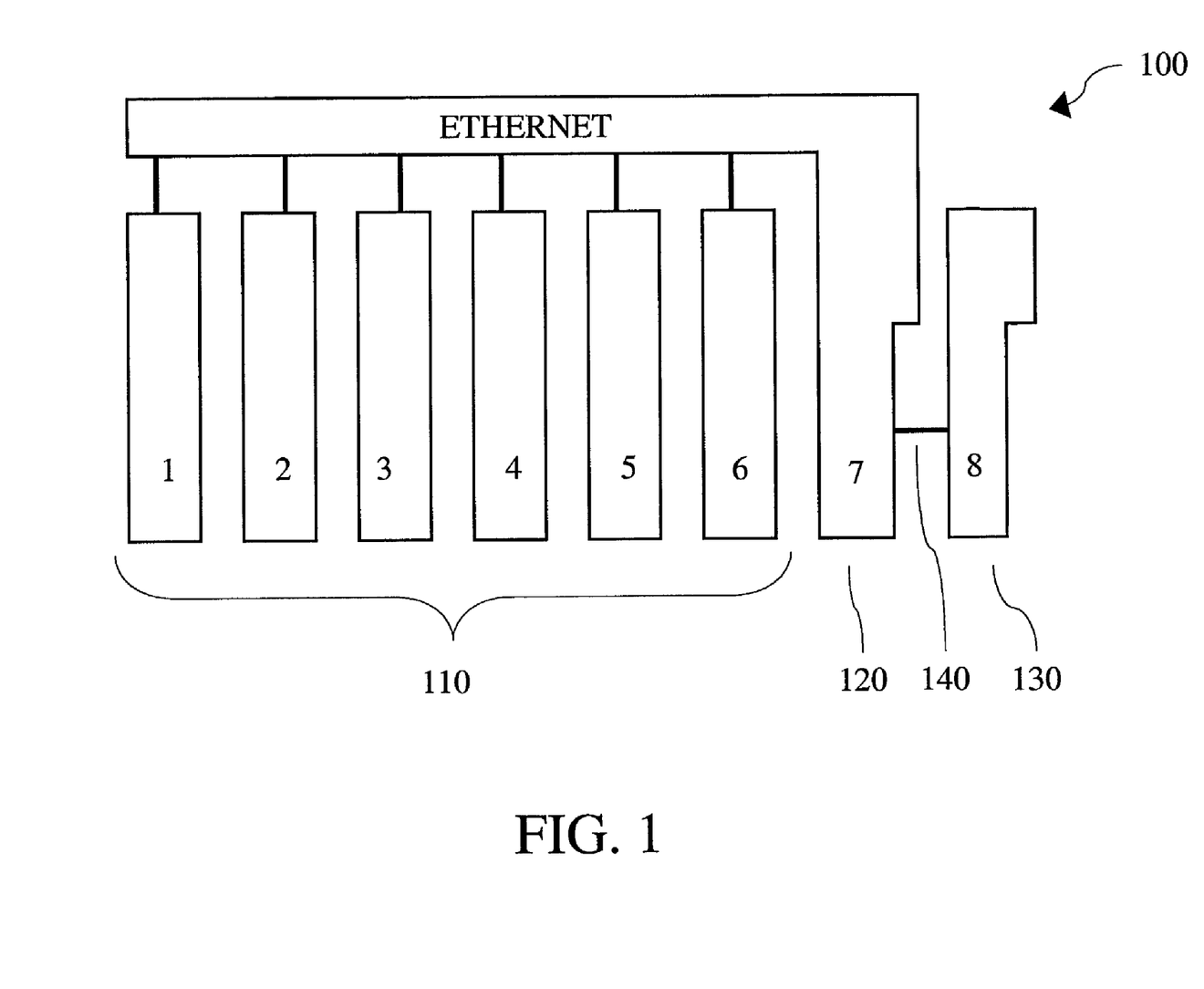
FIG. 1 is a representation of communications system chassis.

FIG. 1 shows a representation of an ICS chassis 100 with 8 card slots. Other configurations are possible with differing numbers and types of slots. In this specification an exemplary 8 slot ICS chassis is used for illustrative purposes, but an ICS Chassis may be configured with both more and less slots as well as different slot types. The first six card slots 110, are numbered 1 through 6, and may interchangeably house various cards selected by the user. The cards that can be selected by the user for slots 1 through 6 include multiservice route processor cards ("MRP") and system processing engine cards ("SPE").

A SPE is a single board computer that runs system software applications such as Cisco Systems, Inc.'s ICS 7700 System Manager and Cisco Systems, Inc. CallManager. At least two types of SPEs are manufactured by Cisco Systems, Inc. which can be installed in slots 1 through 6: Cisco Systems, Inc.'s model SPE 310 which has a 700-MHz Pentium III processor, a 20.4-GB hard disk drive, up to 1.5 GB of memory, a keyboard port, two universal serial bus ("USB") ports, and a video port, and Cisco Systems, Inc.'s model SPE 200 which has a 266-MHz Pentium II processor, a 6-GB hard disk drive, and 512 MB of memory.

Slot 7, 120, may be dedicated to a system switch processor ("SSP") which is an Ethernet switch that passes data among all cards in the ICS chassis 100 and to any other Ethernet switches connected to the system. Slot 7, 120, is designed to house an SSP which is an Ethernet switch, thus slot 7, 120, is represented in FIG. 1 as being operationally coupled via the Ethernet switch to slots 1 through 6, 110. Slot 7, 120, may be directly coupled to slot 8, 130. Said coupling is represented by connector 140.

Slot 8, 130, may be dedicated to a system alarm processor card ("SAP") which is a module that monitors the status of the chassis, power supply modules, and fans, and feeds real-time data to the SPEs. The cards occupying slots 1 through 8 are referred to as internal occupants. The SSP may be operationally coupled to other network devices that are not within the ICS chassis system.

Figure 2:
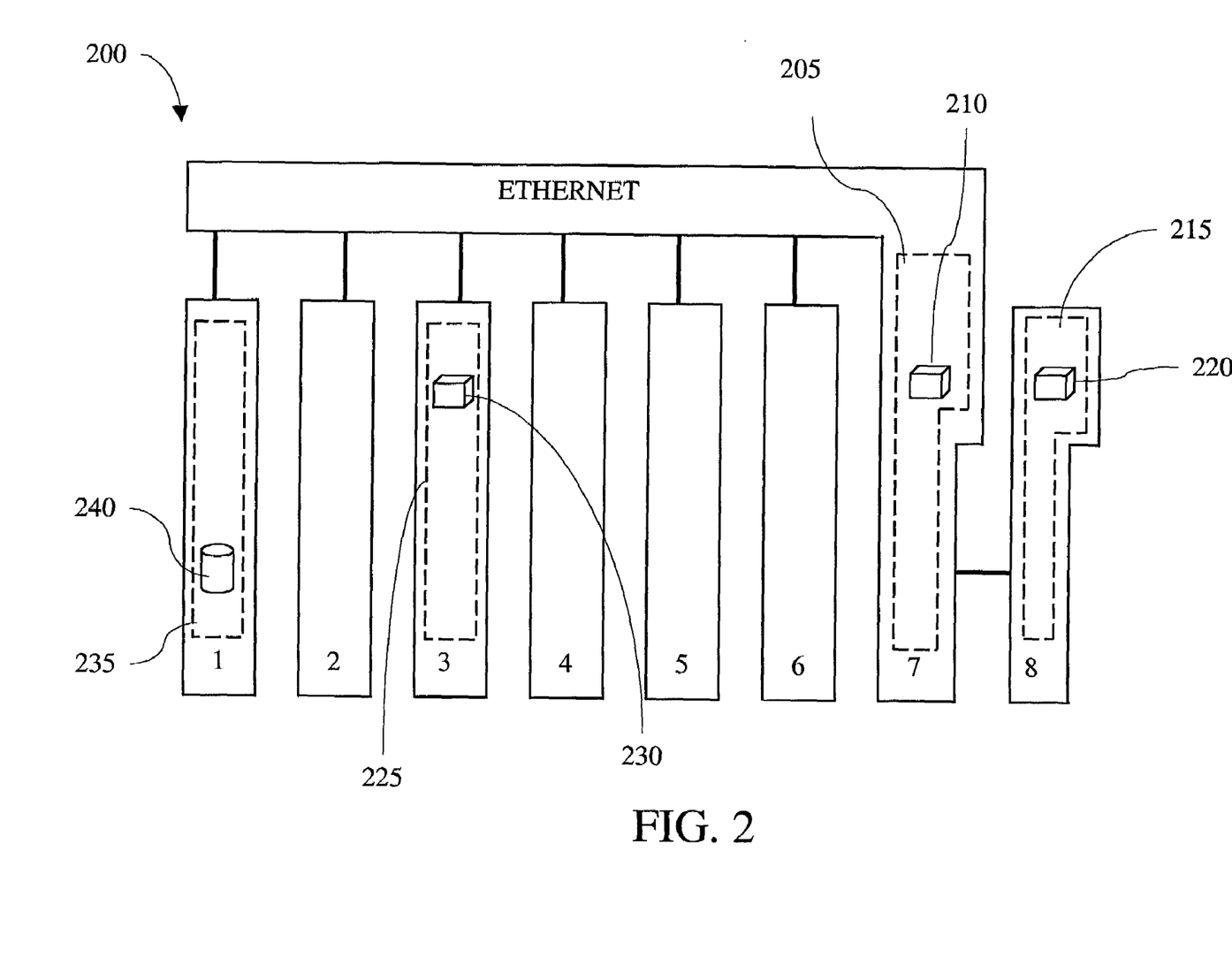
FIG. 2 is another representation of a communications system chassis.

FIG. 2 is a conceptual diagram of one aspect of a disclosed system 200. The system 200 may include an Ethernet backplane shown by slot 7 for providing connectivity to at least one internal chassis occupant. In one disclosed aspect of a system 200, the backplane of slot 7 may comprise an SSP 205 as described above. The SSP is shown occupying slot 7 in system 200, but the SSP may occupy any other slot as may be designed. The SSP may further comprise a configuration protocol client 210.

The system 200 may further include a SAP 215 for monitoring the status of the system and for providing external connectivity. The SAP 215 may be installed in slot 8 of the system, though the system may be designed such that the SAP may occupy any desired slot. The SAP may further comprise a configuration protocol client 220.

The system 200 may further include at least one SPE 225 operatively disposed within the system 200 at slot 3. In the shown embodiment the SPE may occupy any of the slots 1 through 6. The SPE may have installed a package of controlling software 230 known as System Manager. The System Manager 230 manages useful but sensitive information regarding the entire chassis, such as system accounts and passwords. The SPE with the System Manager installed on it, may be known as the System Manager SPE or "SMSPE".

The system 200 may further include at least one SPE 235 operatively disposed within the system 200 at slot 1. In the shown embodiment the at least one SPE may occupy any of the slots 1 through 6. The SPE may have installed a package of software 240 known as an information request module. The SPE may need to access the chassis data which is available to the SMSPE.

Discovery Protocol

The disclosed system uses a discovery protocol known as the Cisco Discovery Protocol ("CDP") disclosed in U.S. patent application Ser. No. 09/922,175 filed on Aug. 1, 2001. U.S. patent application Ser. No. 09/922,175 filed on Aug. 1, 2001 is incorporated by reference as though fully set forth herein. The cards which occupy slots 1 through 7 in the ICS chassis may have a built in discovery protocol such as CDP installed. CDP is a network protocol for discovering neighboring devices. Each card in slots 1 through 7 of the ICS chassis is a CDP-compatible device which sends periodic messages to the SSP. Among the CDP information sent to the SSP with respect to each card are the following: the IP address assigned to each card; and the platform string for each card, which specifies what the card is, i.e. an SPE and an MRP. CDP is just one discovery protocol known in the art, and is used in this specification and these claims for non-limiting illustrative purposes. This system may also be configured to use other discovery protocols.

The communications between the various components of the ICS chassis may be via standard communications protocols, such as HTTP. HTTP is the communication protocol used for transmitting data between servers and clients (browsers) on the World Wide Web. HTTP also has variants, such as Secure HyperText Transfer Protocol ("SHTTP") and one based on the Secure Sockets Layer ("SLL") where URLs are addressed HTTPS.

Figure 3:
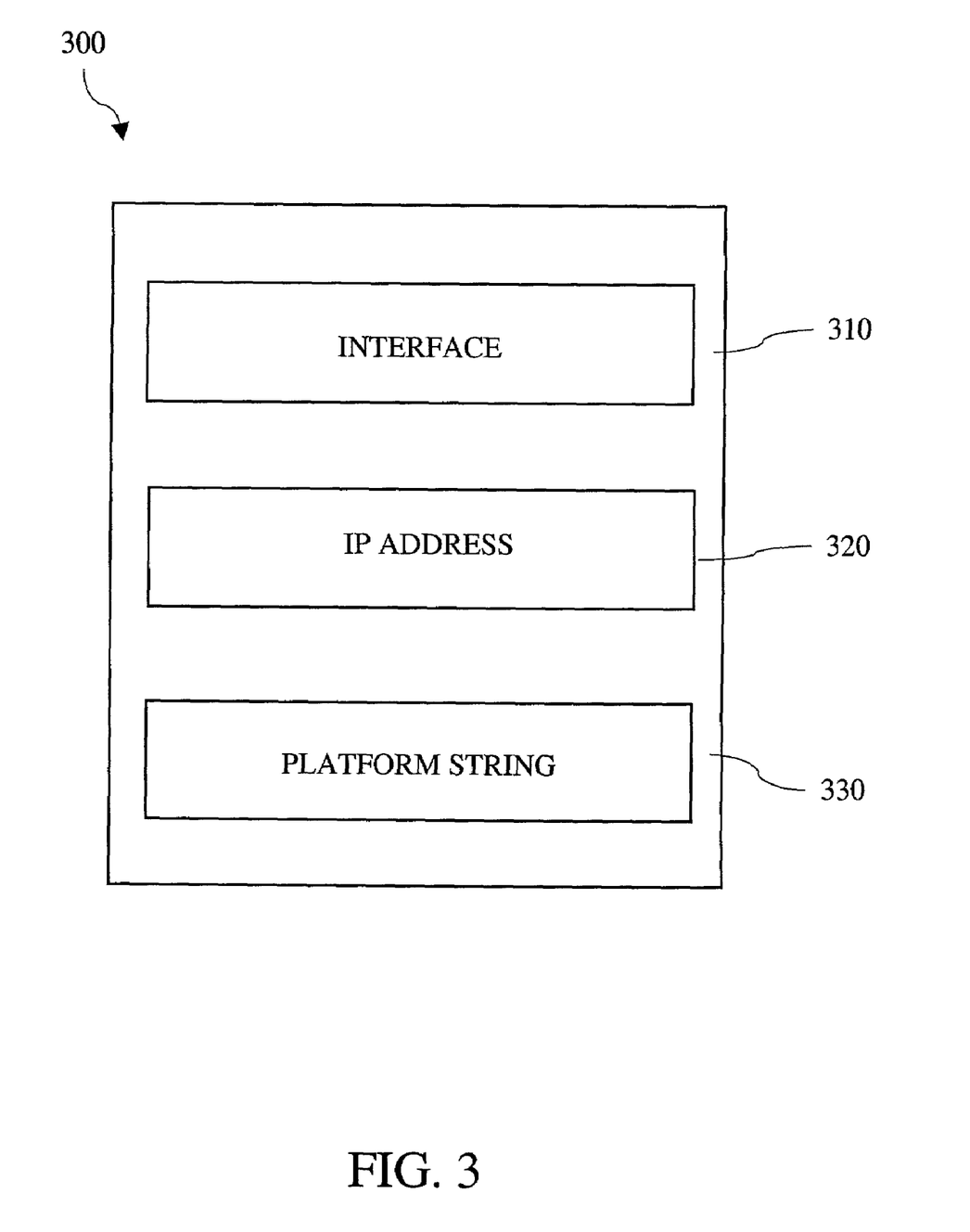
FIG. 3 is a representation of one embodiment of a CDP data package.

Because of the above described CDP, the SSP has CDP information with respect to each card in the ICS chassis. Therefore other components in the system needing internal occupant information, such as is associated with CDP Information, may request CDP data packages from the SSP. FIG. 3 shows one embodiment of a CDP data package 300 as obtained from the SSP. The information stored in the data package 300 for each card in the ICS chassis includes an interface information 310, an IP address 320, and a platform string 330.

Figure 4:
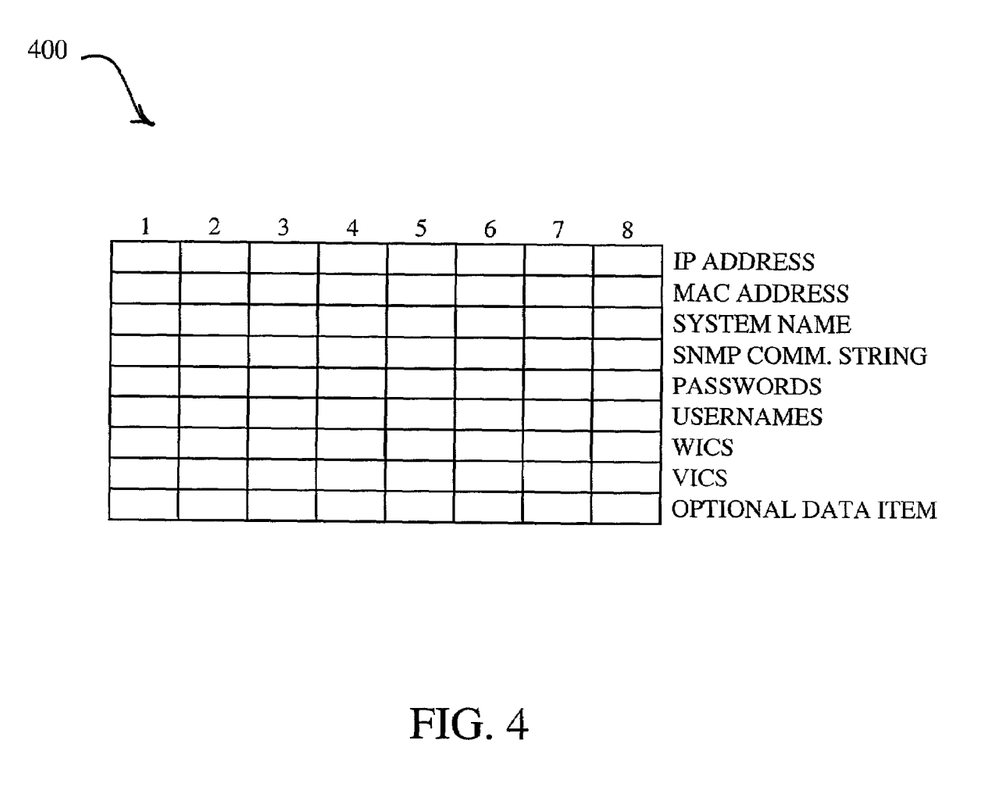
FIG. 4 is a representation of one embodiment of a data table.

The SMSPE may create a populated data table through an algorithm described in patent application Ser. No. 09/922,175. Referring to FIG. 4, one embodiment of a populated data table is disclosed. In the populated data table 400, there may be 8 columns, each column corresponding to one of the eight slots in an ICS chassis. For each column, certain data are saved, these data include, without limitation the following: IP Address, MAC address, System Name, SNMP community string, passwords, usernames, WICS, VICS, and other optional data items. The populated data table may be saved in a retrievable storage device, such as the SMSPE.

Figure 5:
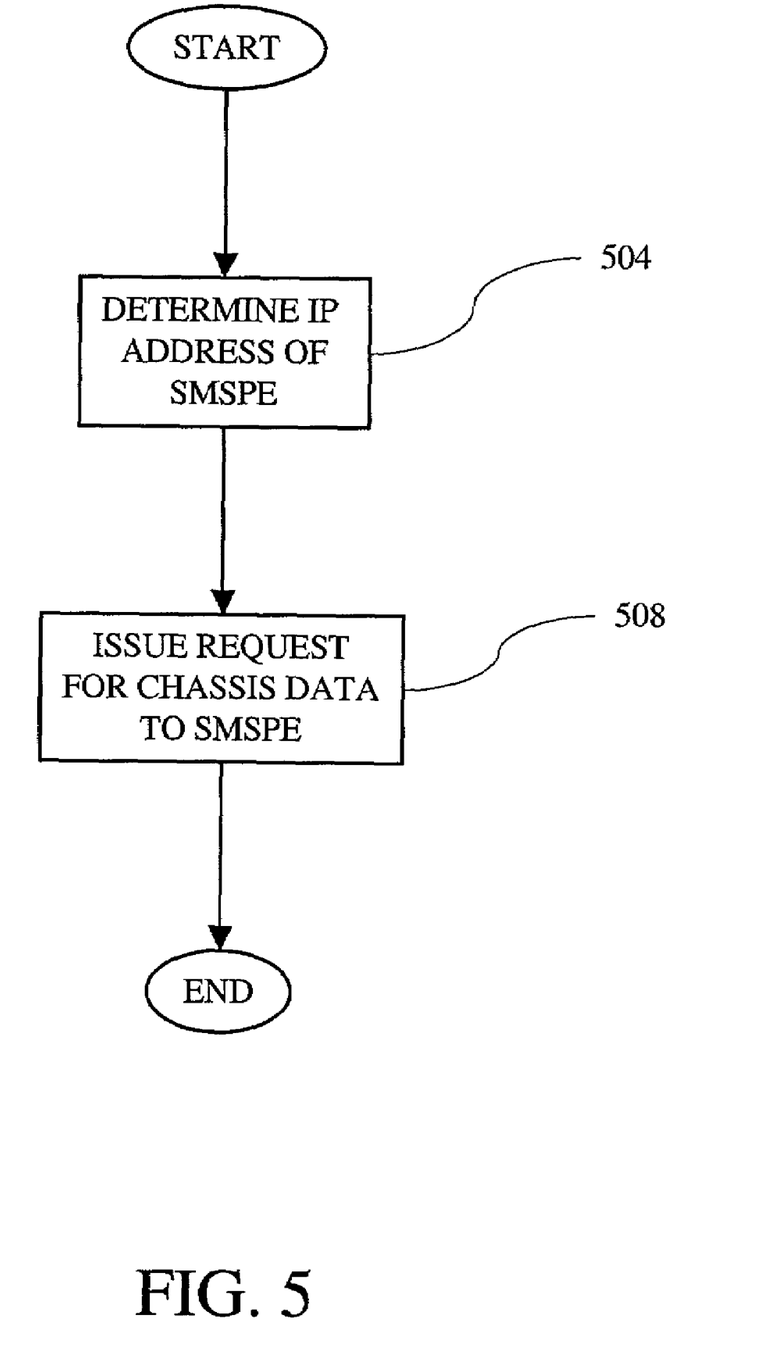
FIG. 5 is a flowchart representing an aspect of the disclosed system.

Referring to FIG. 5, one embodiment of a disclosed method is shown. A software module stored on the SPE performs the method disclosed. At act 504, the module determines the IP address of the SMSPE. At act 508, the method issues to the SMSPE a request for Chassis Data. The Chassis Data may be retrieved from the populated data table described above. This Chassis Data may include sensitive information. Thus a system for verifying that the SPE making the request for Chassis Data is an internal occupant is described below.

Figure 6:
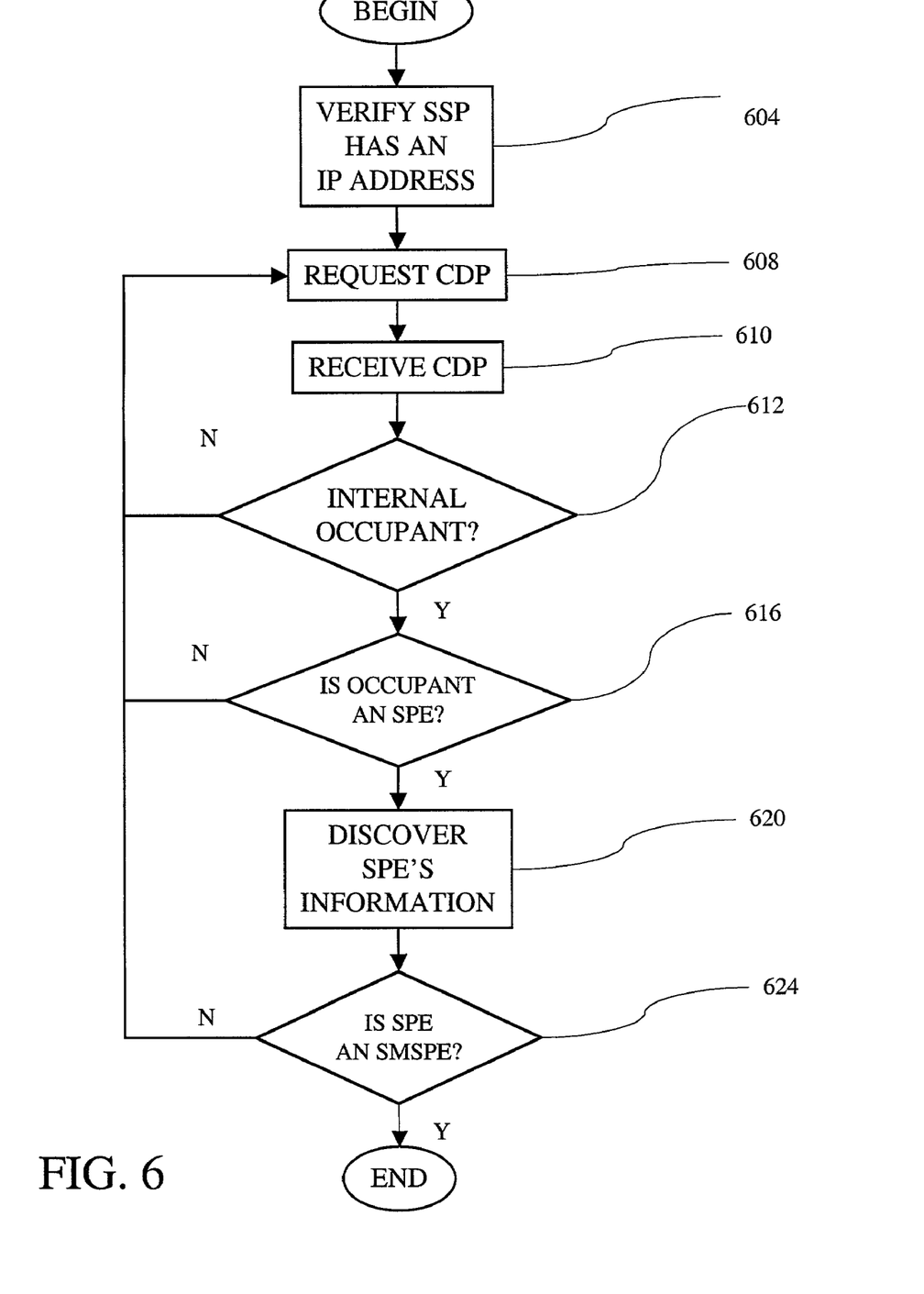
FIG. 6 is a flowchart representing another aspect of the disclosed system.

Referring to FIG. 6, one embodiment showing a more detailed method of determining the SMSPE's IP address is shown. A software module stored on the SPE performs the method disclosed. At act 604 the module verifies that the SSP has an IP address. At act 608 the module requests a CDP from the SSP. At act 610, the module receives the CDP. At act 610, the module receives the CDP. At query 612 the module determines whether the CDP corresponds to an internal chassis occupant. If the CDP corresponds to an internal chassis occupant, the module determines whether the occupant is an SPE at query 616. If the occupant is an SPE, the module discovers the SPE's information at act 620. Once the module has the SPE's information, the module determines whether the SPE is an SMSPE at query 624. If the SPE is an SMSPE, then the module has the IP address for the SMSPE and that portion of the module ends.

Figure 7:
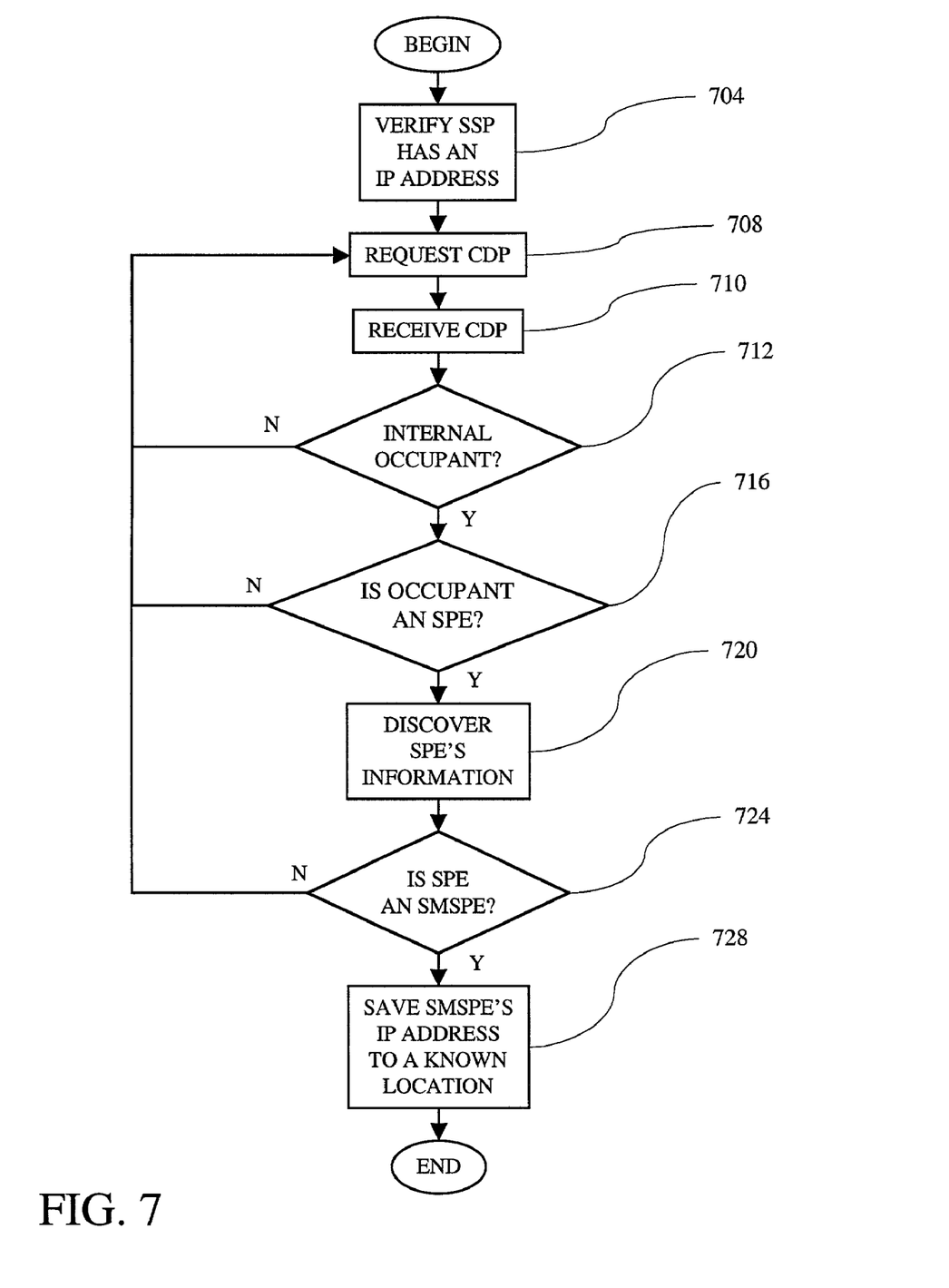
FIG. 7 is a flowchart representing another aspect of the disclosed system.

Referring to FIG. 7, an embodiment of a disclosed method of determining the SMSPE's IP address and providing it to other SPEs is shown. A software module stored on the SMSPE performs the method disclosed, although in another configuration, the module may be stored on one or more of the SPEs. At act 704 the module verifies that the SSP has an IP address. At act 708 the module requests a CDP from the SSP. At act 710, the module receives the CDP. At query 712 the module determines whether the CDP corresponds to an internal chassis occupant. If the CDP corresponds to an internal chassis occupant, the module determines whether the occupant is an SPE at query 716. If the occupant is an SPE, the module discovers the SPE's information at act 720. Once the module has the SPE's information, the module determines whether the SPE is an SMSPE at query 724. If the SPE is an SMSPE, then the module saves the SMSPE's IP address to a known location at act 728. Some non-limiting examples of this known location may be in a Windows registry key for each SPE or in a particular file location on each SPE hard drive. In another embodiment, rather than saving the IP address to a known location at act 728, the module may broadcast the IP address to the other components of the disclosed system. Thus, when the SPE goes to determine the IP address of the SMSPE, the SPE can either go directly to the known location and obtain the IP address, or the SPE may simply receive the IP address of the SMSPE through the broadcast.

Figure 8:
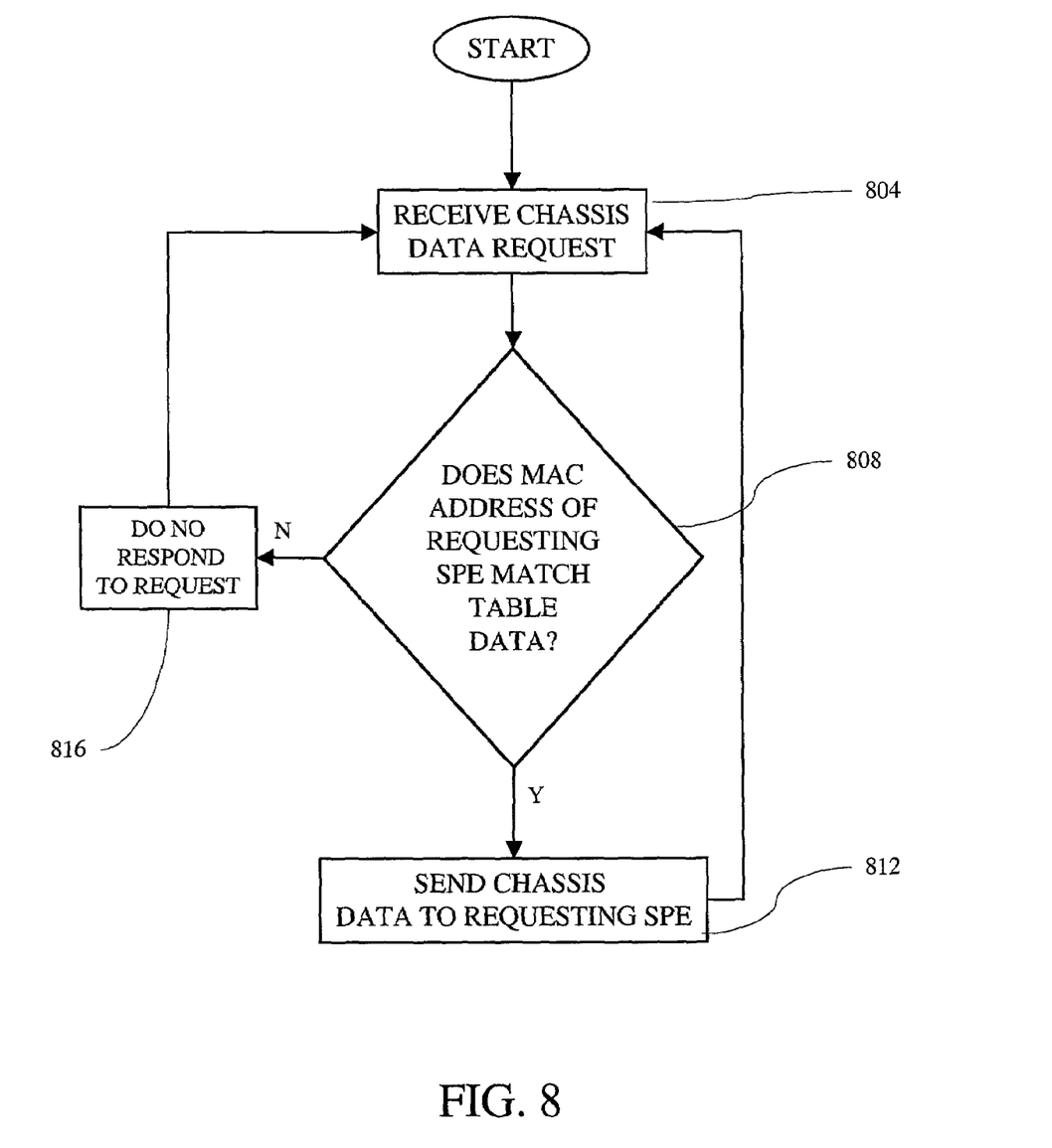
FIG. 8 is a flowchart representing another aspect of the disclosed system.

Referring to FIG. 8, another embodiment of the disclosed method is shown. A software module stored on the SMSPE performs the method disclosed. At act 804, the method receives a Chassis Data request. At query 808, the method determines whether the requesting SPE's MAC address corresponds to the MAC address previously stored on the populated data table. If the method determines that the request is not from an internal SPE, then at act 816, the method does not respond to the Chassis Data request. If the method determines that the request is from an internal SPE, the method sends the Chassis Data to the requesting SPE at act 812.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a communications system apparatus with an Ethernet backplane, a System Switch Processor ("SSP"), at least one system processing engine ("SPE"), and a system manager SPE ("SMSPE"), a method for requesting chassis data from said SMSPE by said at least one SPE comprising:

determining the IP address of said SMSPE, wherein said
determining the IP address comprises:
verifying that said SSP has an IP address,
requesting a discovery protocol data package from said SSP,
receiving a discovery protocol data package from said SSP,
determining whether the requested discovery protocol data package corresponds to an internal occupant,
determining whether the internal occupant is an SPE, if the discovery protocol data package corresponds to an internal occupant,
discovering the SPE's information, if the internal occupant is an SPE, and
determining whether the SPE is an SMSPE; and
issuing a request for chassis data to the SMSPE.

2. In a communications system apparatus with an Ethernet backplane, an SSP and at least one SPE and a SMSPE, a method for determining and saving the IP address of said SMSPE to a well known location in said communications system apparatus comprising:
verifying that said SSP has an IP address;
requesting a discovery protocol data package from said SSP;
receiving a discovery protocol data package from said SSP;
determining whether the requested discovery protocol data package corresponds to an internal occupant;
determining whether the internal occupant is an SPE, if the discovery protocol data package corresponds to an internal occupant;
discovering the SPE's information, if the internal occupant is an SPE;
determining whether said SPE is an SMSPE; and
saving SMSPE's IP address to a well known location in said communications system apparatus, if said SPE is an SMSPE.

3. The method of claim 2, wherein said well known location is a Windows registry key for each said at least one SPE and said SMSPE.

4. The method of claim 2, wherein said well known location is a particular file location on each said at least one SPE's hard drive and said SMSPE's hard drive.

5. In a communications system apparatus with an Ethernet backplane, at least one SPE, a SMSPE, an SSP, and the IP address of said SMSPE stored in a well known location in said communications system apparatus, a method for requesting chassis data from said SMSPE by said at least one SPE and said SMSPE comprising:
verifying that said SSP has an IP address;
requesting a discovery protocol data package from said SSP;
receiving a discovery protocol data package from said SSP;
determining whether the requested discovery protocol data package corresponds to an internal occupant;
determining whether the internal occupant is an SPE, if the discovery protocol data package corresponds to an internal occupant;
discovering the SPE's information, if the internal occupant is an SPE;
determining whether the SPE is an SMSPE;
retrieving said SMSPE's IP address from said well known location in said communications system apparatus; and
issuing a request for chassis data to the SMSPE.

6. The method of claim 5, wherein said well known location is a Windows registry key for each said at least one SPE and said SMSPE.

7. The method of claim 5, wherein said well known location is a particular file location on each said at least one SPE's hard drive and said SMSPE's hard drive.

8. In a communications system apparatus with an Ethernet backplane, an SSP, at least one SPE, and a SMSPE, a method for determining and broadcasting the IP address of said SMSPE comprising:
verifying that said SSP has an IP address;
requesting a discovery protocol data package from said SSP;
receiving a discovery protocol data package from said SSP;
determining whether the requested discovery protocol data package corresponds to an internal occupant;
determining whether the internal occupant is an SPE, if the discovery protocol data package corresponds to an internal occupant;
discovering the SPE's information, if the internal occupant is an SPE;
determining whether said SPE is an SMSPE; and
broadcasting the SMSPE's IP address.

9. In a communications system apparatus with an Ethernet backplane, an SSP, at least one SPE, a SMSPE and the broadcasting of the IP address of said SMSPE, a method for requesting chassis data from said SMSPE by said at least one SPE and said SMSPE comprising:
verifying that said SSP has an IP address;
requesting a discovery protocol data package from said SSP;
receiving a discovery protocol data package from said SSP;
determining whether the requested discovery protocol data package corresponds to an internal occupant;
determining whether the internal occupant is an SPE, if the discovery protocol data package corresponds to an internal occupant;
discovering the SPE's information, if the internal occupant is an SPE;
determining whether the SPE is an SMSPE;
receiving said SMSPE's IP address from said broadcasting of the IP address of said SMSPE; and
issuing a request for chassis data to the SMSPE.

10. In a communications system apparatus with an Ethernet backplane, an SSP, at least one SPE, and a SMSPE, a program storage device readable by a machine, tangibly embodying a program of instructions executable by the machine to perform a method for requesting chassis data from said SMSPE by said at least one SPE comprising:
determining the IP address of said SMSPE, wherein the act of determining the IP address of said SMSPE comprises:
verifying that said SSP has an IP address,
requesting a discovery protocol data package from said SSP,
receiving a discovery protocol data package from said SSP,
determining whether the requested discovery protocol data package corresponds to an internal occupant,
determining whether the internal occupant is an SPE, if the discovery protocol data package corresponds to an internal occupant, discovering the SPE's information, if the internal occupant is an SPE, and determining whether the SPE is an SMSPE; and issuing a request for chassis data to the SMSPE.

11. In a communications system apparatus with an Ethernet backplane, an SSP, at least one SPE, and a SMSPE, a program storage device readable by a machine, tangibly embodying a program of instructions executable by the machine to perform a method for determining and saving the IP address of said SMSPE to a well known location in said communications system apparatus comprising:

verifying that said SSP has an IP address;

requesting a discovery protocol data package from said SSP;

receiving a discovery protocol data package from said SSP;

determining whether the requested discovery protocol data package corresponds to an internal occupant;

determining whether the internal occupant is an SPE, if the discovery protocol data package corresponds to an internal occupant;

discovering the SPE's information, if the internal occupant is an SPE;

determining whether said SPE is an SMSPE; and saving SMSPE's IP address to a well known location in said communications system apparatus, if said SPE is an SMSPE.

12. The method of claim 11, wherein said well known location is a Windows registry key for each said at least one SPE and said SMSPE.

13. The method of claim 11, wherein said well known location is a particular file location on each said at least one SPE's hard drive and said SMSPE's hard drive.

14. In a communications system apparatus with an Ethernet backplane, an SSP, at least one SPE, a SMSPE and the IP address of said SMSPE stored in a well known location in said communications system apparatus, a program storage device readable by a machine, tangibly embodying a program of instructions executable by the machine to perform a method for requesting chassis data from said SMSPE by said at least one SPE and said SMSPE comprising:

verifying that said SSP has an IP address;

requesting a discovery protocol data package from said SSP;

receiving a discovery protocol data package from said SSP;

determining whether the requested discovery protocol data package corresponds to an internal occupant;

determining whether the internal occupant is an SPE, if the discovery protocol data package corresponds to an internal occupant;

discovering the SPE's information, if the internal occupant is an SPE;

determining whether the SPE is an SMSPE;

retrieving said SMSPE's IP address from said well known location in said communications system apparatus; and issuing a request for chassis data to the SMSPE.

15. The method of claim 14, wherein said well known location is a Windows registry key for each said at least one SPE and said SMSPE.

16. The method of claim 14, wherein said well known location is a particular file location on each said at least one SPE's hard drive and said SMSPE's hard drive.

17. In a communications system apparatus with an Ethernet backplane, an SSP, at least one SPE, and a SMSPE, a program storage device readable by a machine, tangibly embodying a program of instructions executable by the machine to perform a method for determining and broadcasting the IP address of said SMSPE comprising:

verifying that said SSP has an IP address;

requesting a discovery protocol data package from said SSP;

receiving a discovery protocol data package from said SSP;

determining whether the requested discovery protocol data package corresponds to an internal occupant;

determining whether the internal occupant is an SPE, if the discovery protocol data package corresponds to an internal occupant;

discovering the SPE's information, if the internal occupant is an SPE;

determining whether said SPE is an SMSPE; and broadcasting the SMSPE's IP address.

18. In a communications system apparatus with an Ethernet backplane, an SSP, at least one SPE, a SMSPE and the broadcasting of the IP address of said SMSPE, a program storage device readable by a machine, tangibly embodying a program of instructions executable by the machine to perform a method for requesting chassis data from said SMSPE by said at least one SPE and said SMSPE comprising:

verifying that said SSP has an IP address;

requesting a discovery protocol data package from said SSP;

receiving a discovery protocol data package from said SSP;

determining whether the requested discovery protocol data package corresponds to an internal occupant;

determining whether the internal occupant is an SPE, if the discovery protocol data package corresponds to an internal occupant;

discovering the SPE's information, if the internal occupant is an SPE;

determining whether the SPE is an SMSPE;

receiving said SMSPE's IP address from said broadcasting of the IP address of said SMSPE; and issuing a request for chassis data to the SMSPE.

19. In a communications system apparatus with an Ethernet backplane, an SSP, at least one system processing engine ("SPE"), and a system manager SPE ("SMSPE"), wherein each SPE comprises:

means for determining the IP address of said SMSPE, wherein said means for determining the IP address of said SMSPE comprises:

means for verifying that said SSP has an IP address, means for requesting a discovery protocol data package from said SSP, means for receiving a discovery protocol data package from said SSP, means for determining whether the requested discovery protocol data package corresponds to an internal occupant, means for determining whether the internal occupant is an SPE, if the discovery protocol data package corresponds to an internal occupant, means for discovering the SPE's information, if the internal occupant is an SPE, and means for determining whether the SPE is an SMSPE; and means for issuing a request for chassis data to the SMSPE.

20. In a communications system apparatus with an Ethernet backplane, an SSP, at least one SPE, and a SMSPE, said SMSPE comprising:

means for verifying that said SSP has an IP address;

means for requesting a discovery protocol data package from said SSP;
means for receiving a discovery protocol data package from said SSP;
means for determining whether the requested discovery protocol data package corresponds to an internal occupant;
means for determining whether the internal occupant is an SPE, if the discovery protocol data package corresponds to an internal occupant;
means for discovering the SPE's information, if the internal occupant is an SPE;
means for determining whether said SPE is an SMSPE; and
means for saving SMSPE's IP address to a well known location in said communications system apparatus, if said SPE is an SMSPE.

21. The SMSPE of claim 20, wherein said well known location is a Windows registry key for each said at least one SPE and said SMSPE.

22. The SMSPE of claim 20, wherein said well known location is a particular file location on each said at least one SPE's hard drive and said SMSPE's hard drive.

23. In a communications system apparatus with an Ethernet backplane, an SSP, at least one SPE, a SMSPE and the IP address of said SMSPE stored in a well known location in said communications system apparatus, wherein said SMSPE and each said SPE comprises:
means for verifying that said SSP has an IP address;
means for requesting a discovery protocol data package from said SSP;
means for receiving a discovery protocol data package from said SSP;
means for determining whether the requested discovery protocol data package corresponds to an internal occupant;
means for determining whether the internal occupant is an SPE, if the discovery protocol data package corresponds to an internal occupant;
means for discovering the SPE's information, if the internal occupant is an SPE;
means for determining whether the SPE is an SMSPE;
means for retrieving said SMSPE's IP address from said well known location in said communications system apparatus; and
means for issuing a request for chassis data to the SMSPE.

24. The method of claim 23, wherein said well known location is a Windows registry key for each said at least one SPE and said SMSPE.

25. The method of claim 23, wherein said well known location is a particular file location on each said at least one SPE's hard drive and said SMSPE's hard drive.

26. In a communications system apparatus with an Ethernet backplane, an SSP, at least one SPE, and a SMSPE, wherein said SMSPE comprises:
means for verifying that said SSP has an IP address;
means for requesting a discovery protocol data package from said SSP;
means for receiving a discovery protocol data package from said SSP;
means for determining whether the requested discovery protocol data package corresponds to an internal occupant;
means for determining whether the internal occupant is an SPE, if the discovery protocol data package corresponds to an internal occupant;
means for discovering the SPE's information, if the internal occupant is an SPE;
means for determining whether said SPE is an SMSPE; and
means for broadcasting the SMSPE's IP address.

27. In a communications system apparatus with an Ethernet backplane, an SSP, at least one SPE, a SMSPE and the broadcasting of the IP address of said SMSPE, wherein said SMSPE and each said SPE comprises:
means for verifying that said SSP has an IP address;
means for requesting a discovery protocol data package from said SSP;
means for receiving a discovery protocol data package from said SSP;
means for determining whether the requested discovery protocol data package corresponds to an internal occupant;
means for determining whether the internal occupant is an SPE, if the discovery protocol data package corresponds to an internal occupant;
means for discovering the SPE's information, if the internal occupant is an SPE;
means for determining whether the SPE is an SMSPE;
means for receiving said SMSPE's IP address from said broadcasting of the IP address of said SMSPE; and
means for issuing a request for chassis data to the SMSPE.

28. A communications system apparatus with an Ethernet backplane, said apparatus comprising:
a System Switch Processor ("SSP");
at least one system processing engine ("SPE");
a system manager SPE ("SMSPE"); and
wherein said SPE is configured to:
verify that said SSP has an IP address,
request a discovery protocol data package from said SSP;
receive a discovery protocol data package from said SSP;
determine whether the requested discovery protocol data package corresponds to an internal occupant;
determine whether the internal occupant is an SPE, if the discovery protocol data package corresponds to an internal occupant;
discover the SPE's information, if the internal occupant is an SPE;
determine whether the SPE is an SMSPE,
determine the IP address of said SMSPE, and
issue a request for chassis data to said SMSPE.

29. In a communications system apparatus with an Ethernet backplane, an SSP, at least one SPE, and a SMSPE, and wherein said SMSPE is configured to:
verify that a SSP has an IP address;
request a discovery protocol data package from said SSP;
receive a discovery protocol data package from said SSP;
determine whether the requested discovery protocol data package corresponds to an internal occupant;
determine whether the internal occupant is an SPE, if the discovery protocol data package corresponds to an internal occupant;
discover the SPE's information, if the internal occupant is an SPE;
determine whether said SPE is an SMSPE; and
save SMSPE's IP address to a well known location in said communications system apparatus, if said SPE is an SMSPE.

30. The SMSPE of claim 29, wherein said well known location is a Windows registry key for each said at least one SPE and said SMSPE.

31. The SMSPE of claim 29, wherein said well known location is a particular file location on each said at least one SPE's hard drive and said SMSPE's hard drive.

32. In a communications system apparatus with an Ethernet backplane, an SSP, at least one SPE, a SMSPE and the IP address of said SMSPE stored in a well known location in said communications system apparatus, and wherein said SMSPE and each said SPE are configured to:
  verify that said SSP has an IP address;
  request a discovery protocol data package from said SSP;
  receive a discovery protocol data package from said SSP;
  determine whether the requested discovery protocol data package corresponds to an internal occupant;
  determine whether the internal occupant is an SPE, if the discovery protocol data package corresponds to an internal occupant;
  discover the SPE's information, if the internal occupant is an SPE;
  determine whether said SPE is an SMSPE;
  retrieve said SMSPE's IP address from said well known location in said communications system apparatus; and
  issue a request for chassis data to the SMSPE.

33. The apparatus of claim 32, wherein said well known location is a Windows registry key for each said at least one SPE and said SMSPE.

34. The apparatus of claim 32, wherein said well known location is a particular file location on each said at least one SPE's hard drive and said SMSPE's hard drive.

35. In a communications system apparatus with an Ethernet backplane, an SSP, at least one SPE, and a SMSPE, and wherein said SMSPE is configured to:
  verify that a SSP has an IP address;
  request a discovery protocol data package from said SSP;
  receive a discovery protocol data package from said SSP;
  determine whether the requested discovery protocol data package corresponds to an internal occupant;
  determine whether the internal occupant is an SPE, if the discovery protocol data package corresponds to an internal occupant;
  discover the SPE's information, if the internal occupant is an SPE;
  determine whether said SPE is an SMSPE; and
  broadcast the SMSPE's IP address.

36. In a communications system apparatus with an Ethernet backplane, an SSP, at least one SPE, a SMSPE and the broadcasting of the IP address of said SMSPE, wherein said SMSPE and each said SPE are configured to:
  verify that said SSP has an IP address;
  request a discovery protocol data package from said SSP;
  receive a discovery protocol data package from said SSP;
  determine whether the requested discovery protocol data package corresponds to an internal occupant;
  determine whether the internal occupant is an SPE, if the discovery protocol data package corresponds to an internal occupant;
  discover the SPE's information, if the internal occupant is an SPE;
  determine whether said SPE is an SMSPE;
  receive said SMSPE's IP address from said broadcasting of the IP address of said SMSPE; and
  issue a request for chassis data to the SMSPE.

* * * * *